United States Patent
Mitsunaga

(10) Patent No.: US 9,891,815 B2
(45) Date of Patent: Feb. 13, 2018

(54) DEVICE HAVING TOUCH SCREEN AND THREE DISPLAY AREAS

(71) Applicant: KYOCERA CORPORATION, Kyoto (JP)

(72) Inventor: Naoki Mitsunaga, Yokohama (JP)

(73) Assignee: KYOCERA Corporation, Kyoto (JP)

(*) Notice: Subject to any disclaimer, the term of this patent is extended or adjusted under 35 U.S.C. 154(b) by 114 days.

(21) Appl. No.: 14/768,711

(22) PCT Filed: Feb. 20, 2014

(86) PCT No.: PCT/JP2014/054090
§ 371 (c)(1),
(2) Date: Aug. 18, 2015

(87) PCT Pub. No.: WO2014/129565
PCT Pub. Date: Aug. 28, 2014

(65) Prior Publication Data
US 2016/0004376 A1    Jan. 7, 2016

(30) Foreign Application Priority Data

Feb. 21, 2013   (JP) .................................. 2013-031990
Feb. 21, 2013   (JP) .................................. 2013-031991

(51) Int. Cl.
*G06F 3/0488*   (2013.01)
*G06F 3/041*    (2006.01)
(Continued)

(52) U.S. Cl.
CPC ........ *G06F 3/04883* (2013.01); *G06F 1/1652* (2013.01); *G06F 1/1684* (2013.01);
(Continued)

(58) Field of Classification Search
CPC .................... G06F 3/016–3/017; G06F 3/0412
See application file for complete search history.

(56) References Cited

U.S. PATENT DOCUMENTS 6,035,180 A    3/2000   Kubes et al.
6,323,846 B1   11/2001  Westerman et al.
(Continued)

FOREIGN PATENT DOCUMENTS

JP    2001-519585 A    10/2001
JP    2006-338496 A    12/2006
(Continued)

OTHER PUBLICATIONS

The Partial Supplementary European Search Report (R. 164 EPC) issued by the European Patent Office on Sep. 16, 2016, which corresponds to European Patent Application No. 14753532.2-1959 and is related to U.S. Appl. No. 14/768,711.

(Continued)

*Primary Examiner* — David Tung
(74) *Attorney, Agent, or Firm* — Studebaker & Brackett PC

(57) ABSTRACT

A device which includes: a housing that has a first surface, a second surface, and a third surface connecting the first surface and the second surface; a touch screen that is disposed on the third surface of the housing; at least one display that is a display, which is disposed inside the housing and has a first display area performing display on the first surface and a second display area performing display on the second surface; and a controller that displays a screen according to a first operation in the first display area if the first operation is detected by the touch screen of the third surface, and displays a screen according to a second operation different from the first operation in the second display area if the second operation is detected by the touch screen of the third surface.

7 Claims, 8 Drawing Sheets

(51) Int. Cl.
    *G06F 3/0481*     (2013.01)
    *G06F 3/0485*     (2013.01)
    *G06F 1/16*     (2006.01)
    *G06F 3/0354*     (2013.01)
    *G06F 3/01*     (2006.01)

(52) U.S. Cl.
    CPC .......... *G06F 3/017* (2013.01); *G06F 3/03547* (2013.01); *G06F 3/0412* (2013.01); *G06F 3/0416* (2013.01); *G06F 3/0485* (2013.01); *G06F 3/04817* (2013.01); *G06F 2203/04101* (2013.01); *G06F 2203/04102* (2013.01); *G06F 2203/04103* (2013.01); *G06F 2203/04104* (2013.01); *G06F 2203/04803* (2013.01)

(56) References Cited

U.S. PATENT DOCUMENTS

| | | | |
|---|---|---|---|
| 8,170,621 B1* | 5/2012 | Lockwood | H04W 52/0254 455/550.1 |
| 8,416,148 B1* | 4/2013 | Park | G06F 3/041 345/1.1 |
| 2007/0188450 A1* | 8/2007 | Hernandez | G06F 1/1626 345/158 |
| 2008/0316169 A1 | 12/2008 | Reifman | |
| 2009/0104932 A1 | 4/2009 | Chiang | |
| 2010/0066643 A1* | 3/2010 | King | G06F 1/1616 345/1.3 |
| 2010/0110031 A1 | 5/2010 | Miyazawa et al. | |
| 2010/0117975 A1* | 5/2010 | Cho | G06F 1/1626 345/173 |
| 2010/0122195 A1* | 5/2010 | Hwang | G06F 3/0488 715/769 |
| 2010/0287470 A1 | 11/2010 | Homma et al. | |
| 2011/0090155 A1 | 4/2011 | Caskey et al. | |
| 2011/0128241 A1* | 6/2011 | Kang | G06F 1/1643 345/173 |
| 2011/0261002 A1* | 10/2011 | Verthein | G06F 1/181 345/174 |
| 2012/0096373 A1 | 4/2012 | Aguera Y Arcas et al. | |
| 2012/0289162 A1* | 11/2012 | Hosoi | H04R 25/606 455/41.3 |
| 2013/0002133 A1* | 1/2013 | Jin | H01L 51/524 313/511 |
| 2013/0033434 A1 | 2/2013 | Richardson et al. | |
| 2013/0076649 A1* | 3/2013 | Myers | H04M 1/0268 345/173 |
| 2013/0217443 A1* | 8/2013 | Lim | H04M 1/0216 455/566 |
| 2013/0271417 A1 | 10/2013 | Nagao | |
| 2014/0132481 A1* | 5/2014 | Bell | H05K 5/0017 345/1.3 |
| 2015/0022445 A1 | 1/2015 | Moriwaki | |

FOREIGN PATENT DOCUMENTS

| | | |
|---|---|---|
| JP | 2010-086081 A | 4/2010 |
| JP | 2010-108273 A | 5/2010 |
| JP | 2010-262557 A | 11/2010 |
| JP | 2011-118244 A | 6/2011 |
| JP | 2012-128668 A | 7/2012 |
| JP | 2013-015835 A | 1/2013 |
| WO | 2008/086302 A1 | 7/2008 |
| WO | 2011/047338 A1 | 4/2011 |
| WO | 2012/081699 A1 | 6/2012 |

OTHER PUBLICATIONS

An Office Action; "Notice of Reasons for Rejection," issued by the Japanese Patent Office on Sep. 15, 2015, which corresponds to Japanese Patent Application No. 2015-501509 and is related to U.S. Appl. No. 14/768,711; with English language concise explanation.
International Search Report for PCT/JP2015/054090 dated May 20, 2014.

* cited by examiner

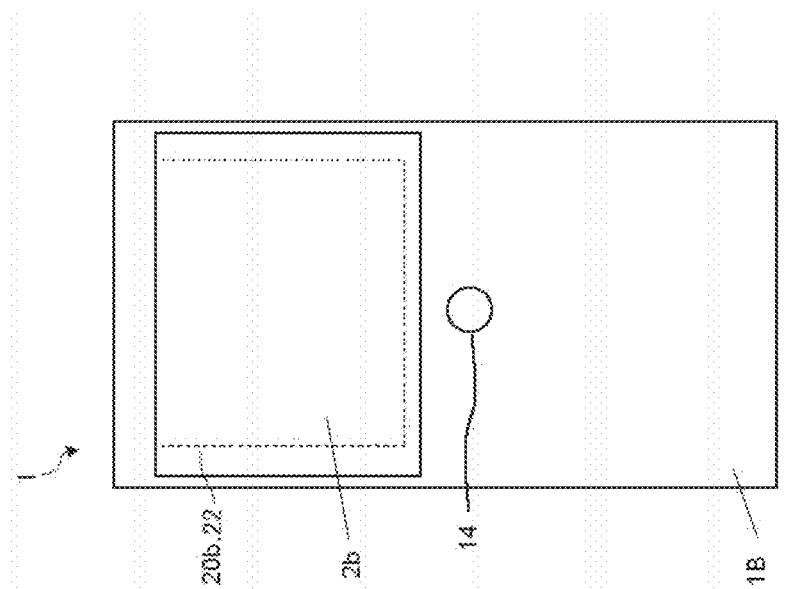
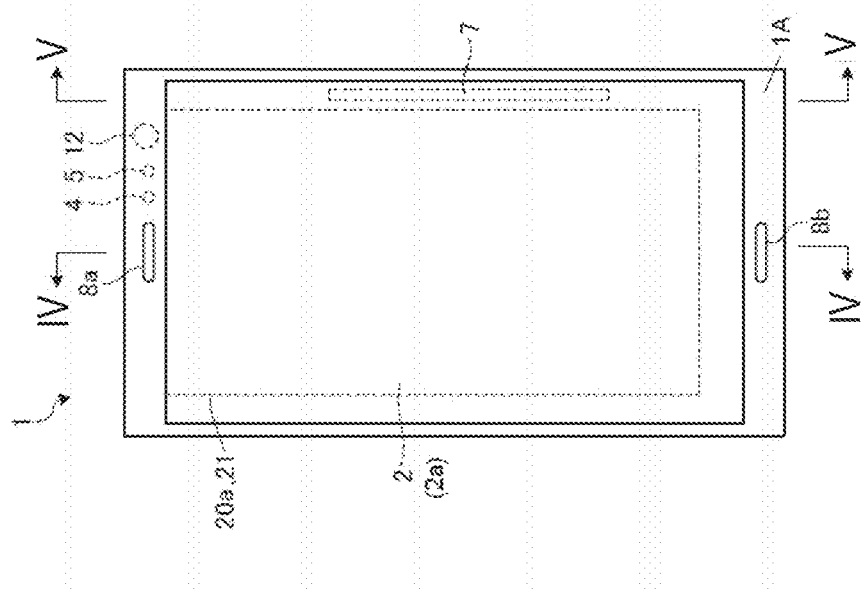

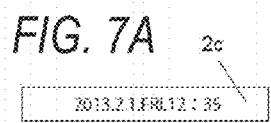
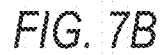
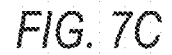
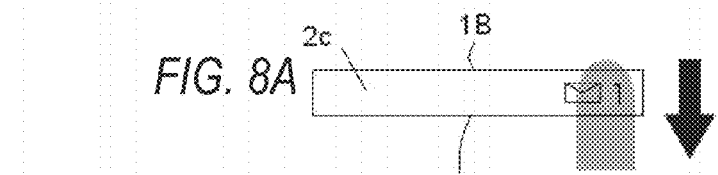
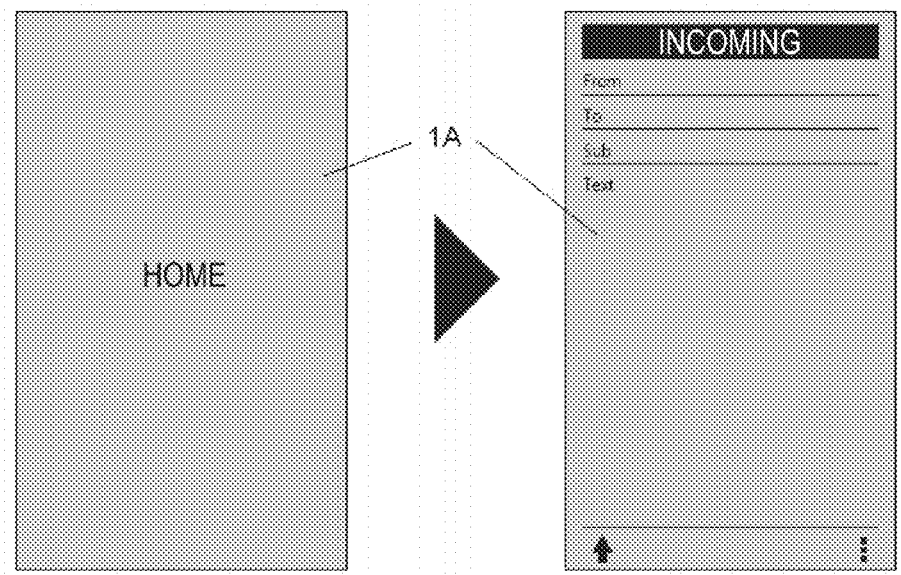

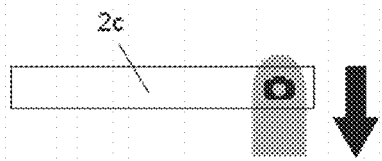
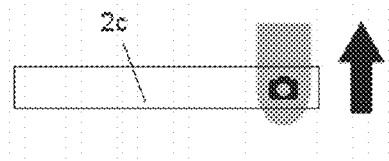
FIG. 11A    FIG. 11B
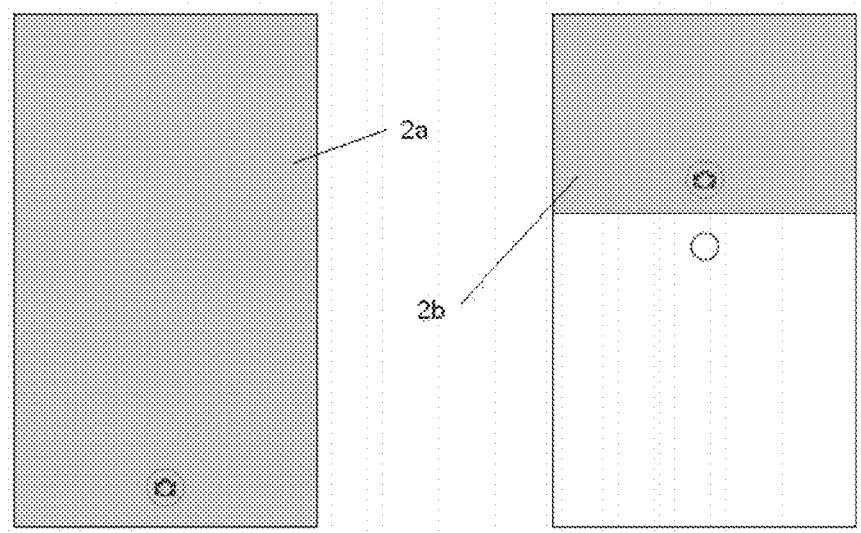
FIG. 12A
FIG. 12B
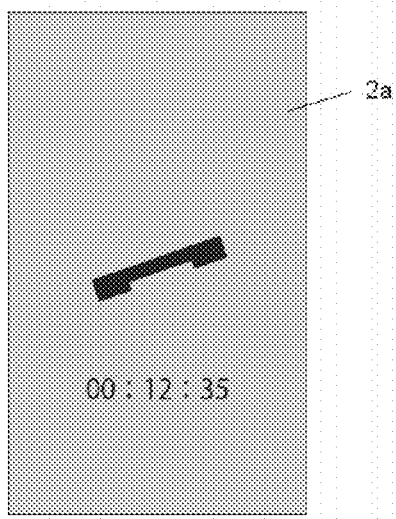

DEVICE HAVING TOUCH SCREEN AND THREE DISPLAY AREAS

TECHNICAL FIELD

The present invention relates to a device provided with a touch screen display.

BACKGROUND ART

There is a known device provided with a touch screen display. Examples of the device provided with the touch screen display include smart phones and tablets. The device provided with the touch screen display detects a gesture of fingers or a stylus pen through the touch screen display. Then, the device provided with the touch screen display operates according to the detected gesture. Examples of an operation according to a detected gesture are described in Patent Literature 1 for instance.

A basic operation of the device provided with the touch screen display is realized by OS (Operating System) of Android (a registered trademark), BlackBerry (a registered trademark) OS, Symbian (a registered trademark) OS, iOS, or Windows (a registered trademark) Phone or the like.

CITATION LIST

Patent Literature

Patent Literature 1: WO 2008/086302

SUMMARY OF INVENTION

Problems that the Invention is to Solve

However, improving of operability was required in the above described device.

An object of the present invention is to provide a device having improved operability.

Means for Solving the Problems

A device according to an aspect of the present invention includes: a housing that has a first surface, a second surface, and a third surface connecting the first surface and the second surface; a touch screen that is disposed on the third surface of the housing; at least one display that is a display, which is disposed inside the housing and has a first display area performing display on the first surface and a second display area performing display on the second surface; and a controller that displays a screen according to a first operation in the first display area if the first operation is detected by the touch screen of the third surface, and displays a screen according to a second operation different from the first operation in the second display area if the second operation is detected by the touch screen of the third surface.

In the device according to the aspect described above, the first operation may be a first gesture operation from the third surface toward the first surface, and the second operation may be a second gesture operation from the third surface toward the second surface.

In the device according to the aspect described above, the first operation and the second operation may be operations on the same icon on the touch screen.

In the device according to the aspect described above, the controller may change the volume of call sound in response to a swipe operation on the touch screen of the third surface.

In the device according to the aspect described above, the display may be one flexible display, and the flexible display may have the first display area and the second display area.

A device according to another aspect of the present invention includes: a housing that has a first surface, a second surface, and a third surface connecting the first surface and the second surface; a display that is a flexible display, which is disposed inside the housing, and has a first display area performing display on the first surface, a second display area performing display on the second surface and a third display area performing display on the third surface; a posture detection unit that detects a posture; and a controller that controls display of the third display area in response to the posture detected by the posture detection unit.

The device according to the aspect described above may include a proximity sensor that determines whether it is close to an object, and in a case where the posture detected by the posture detection unit is in a vertical direction and the proximity sensor determines that it is close to an object, the controller may control the third display area such that the third display area displays predetermined information.

In the device according to the aspect described above, the posture detection unit may detect whether one of the first display area and the second display area is positioned upper than the other of the first display area and the second display area, and the controller may display predetermined information in the one of the first display area and the second display area positioned upper than the other.

A device according to another aspect of the present invention includes: a housing; a panel that is a panel, which is attached to the housing and has a first surface, a second surface, and a third surface connecting the first surface and the second surface; a display that is a display, which is attached to the panel and has a first display area performing display on the first surface, a second display area performing display on the second surface and a third display area performing display on the third surface; and a piezoelectric element that is attached to the display, wherein the panel deforms due to deformation of the piezoelectric element, thereby transmitting human body vibration sound to an object.

Advantageous Effects of the Invention

According to the present invention, it is possible to provide a device having improved operability.

BRIEF DESCRIPTION OF THE DRAWINGS

FIG. 1 is a front view of a mobile phone.
FIG. 2 is a rear view of the mobile phone.
FIGS. 7A, 7B, and 7C are views illustrating display modes in a plurality of display areas of a display.
FIGS. 8A and 8B are views illustrating a first example of display control in the plurality of display areas of the display.

FIGS. 11A and 11B are views illustrating a fourth example of display control in the plurality of display areas of the display.

FIGS. 12A and 12B are views illustrating a first example of control according to a gesture on a third display area.

EMBODIMENTS FOR CARRYING OUT INVENTION

An embodiment for implementing a device according to this application will be described in detail with reference to drawings. Hereinafter, as an example of a device according to an embodiment, a mobile phone will be described.

Figure 3:
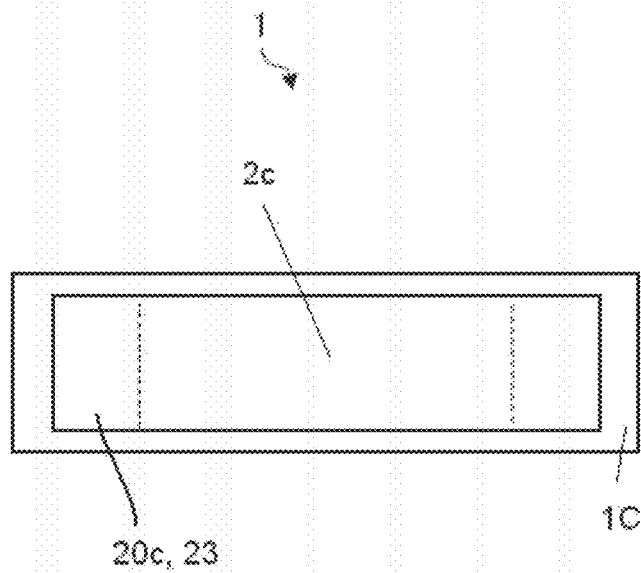
FIG. 3 is a top view of the mobile phone.
Figure 4:
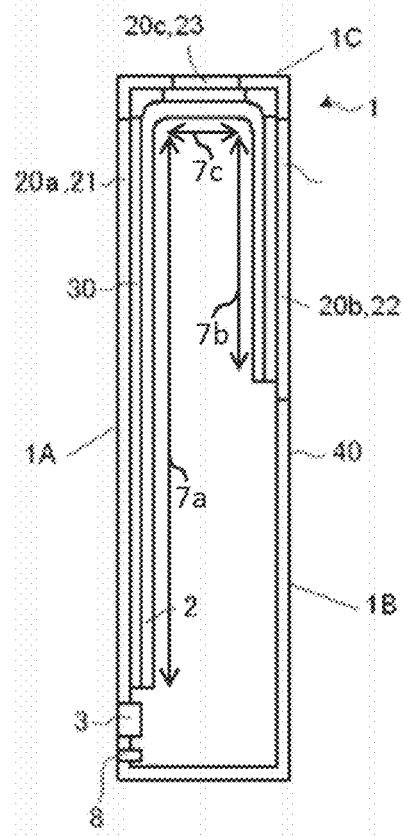
FIG. 4 is a cross-sectional view schematically illustrating a section IV-IV of the mobile phone.
Figure 5:
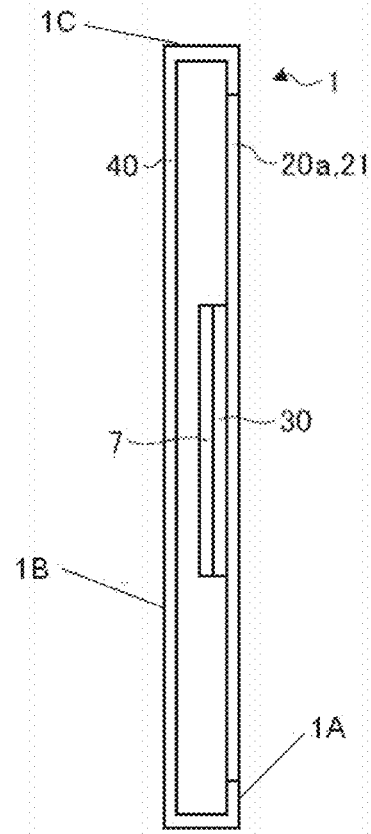
FIG. 5 is a cross-sectional view schematically illustrating a section V-V of the mobile phone.

With reference to FIGS. 1 to 5, the overall configuration of a mobile phone 1 according to an embodiment will be described. FIG. 1 is a front view of the mobile phone 1. FIG. 2 is a rear view of the mobile phone 1. FIG. 3 is a top view of the mobile phone 1. FIG. 4 is a cross-sectional view schematically illustrating a section IV-IV of the mobile phone 1. FIG. 5 is a cross-sectional view schematically illustrating a section V-V of the mobile phone 1.

As shown in FIG. 1, the mobile phone 1 has an illuminance sensor 4, a proximity sensor 5, a piezoelectric element 7, a first microphone 8a and a second microphone 8b, a camera 12, a panel 20a, and a touch screen 21, on its front surface (first surface) 1A.

As shown in FIG. 2, the mobile phone 1 has a camera 14, a panel 20b, and a touch screen 22, on its rear surface (second surface) 1B.

As shown in FIG. 3, the mobile phone 1 has a panel 20c and a touch screen 23, on its top surface (third surface) 1C.

As shown in FIG. 1, the mobile phone 1 has a structural design in which a large-sized display is arranged on the front surface of the device and the microphones are provided at symmetric positions of both ends in the longitudinal direction of a housing 40. The mobile phone 1 has little difference in appearance between a case where an end portion of the housing 40 on the first microphone (8a) side in the longitudinal direction is positioned upper and a case where an end portion of the housing 40 on the second microphone (8b) side in the longitudinal direction is positioned upper.

A display 2 is a display device such as an organic EL device (OELD: Organic Electro-Luminescence Display) having flexibility. As shown in FIG. 4, the display 2 is disposed inside the housing 40 in a state where it is bent. The display 2 displays characters, images, symbols, figures, and so on. The display 2 has a first display area 2a, a second display area 2b, and a third display area 2c. The display 2 can display the same information or different information in each of the first display area 2a, the second display area 2b, and the third display area 2c, according to control of a controller 10 to be described below. According to control of the controller 10 (to be described below), the display 2 is controlled such that the display displays or does not display information in each of the first display area 2a, the second display area 2b, and the third display area 2c. Contents displayed in the first display area 2a can be viewed from the front surface (1A) side through the panel 20a and the touch screen 21. Contents displayed in the second display area 2b can be viewed from the rear surface (1B) side through the panel 20b and the touch screen 22. Contents displayed in the third display area 2c can be viewed from the top surface (1C) side through the panel 20c and the touch screen 23.

The illuminance sensor 4 detects the illuminance of light around the mobile phone 1. Illuminance represents the intensity, brightness, or luminance of light. The illuminance sensor 4 is used, for example, to adjust the luminance of the display 2. The proximity sensor 5 detects the presence of a neighboring object in a non-contract manner. The proximity sensor 5 detects the presence of an object based on a change in a magnetic field, a change in the return time of the reflected wave of an ultrasonic wave, or the like. The proximity sensor 5 detects, for example, that the display 2 is close to a face. The illuminance sensor 4 and the proximity sensor 5 may be configured as one sensor. The illuminance sensor 4 may be used as a proximity sensor.

If an electric signal (a voltage according to a sound signal) is applied, the piezoelectric element 7 expands and contracts or bends according to the electromechanical coupling factor of its constituent material. That is, if an electric signal is applied, the piezoelectric element 7 deforms. The piezoelectric element 7 is attached to the panel 20a, and is used as a vibration source for vibrating the panel 20a. The piezoelectric element 7 is formed, for example, using ceramic or crystal. The piezoelectric element 7 may be a unimorph type, bimorph type, or laminated type piezoelectric element. A laminated type piezoelectric element includes a laminated type bimorph element which is a laminate of bimorphs (for example, a laminate of 16 layers or 24 layers). A laminated type piezoelectric element is composed of a plurality of dielectric layers consisting of, for example, PZT (lead zirconate titanate), and electrode layers interposed between the plurality of dielectric layers. The unimorph type expands and contracts if an electric signal (a voltage) is applied. The bimorph type bends if an electric signal (a voltage) is applied.

The first microphone 8a and the second microphone 8b are sound input units. The first microphone 8a and the second microphone 8b convert input sound into electric signals and transmit the electric signals to the controller 10. The first microphone 8a and the second microphone 8b collect (input) a voice uttered from a user, for example, during a call.

The camera 12 converts acquired images into electric signals and transmits the electric signals to the controller 10. Examples of the camera 12 include an in-camera which photographs objects facing the display 2, and an out-camera which photographs objects facing the opposite surface to the display 2.

The panel 20a vibrates according to deformation (expansion and contraction or bending) of the piezoelectric element 7, and transmits that vibration to the cartilage (auricular cartilage) of an ear which the user brings into contact with the panel 20a. The panel 20a is formed of a synthetic resin such as glass or acrylate. The shape of the panel 20a is, for example, a plate shape. The panel 20a may be a flat plate. The panel 20a may be a curved panel whose surface is smoothly curved. The panel 20a may be a battery lid. The battery lid is a member which is attached to the housing 40 so as to cover a battery. The piezoelectric element 7 may be a component which vibrates a corner of the housing 40 (for example, at least one of four corners). In this case, the piezoelectric element 7 may be a component which is attached to the inner surface of the corner of the housing 40, or an intermediate member may be further provided such that vibration of the piezoelectric element 7 can be transmitted to the corner of the housing 40 through the intermediate member. According to this configuration, since it is possible to make a vibration range relatively narrow, it is difficult for air-conducted sound which is generated by vibration to leak to the surroundings. Also, according to this configuration, for example, in a state where the user has inserted the corner of the housing 40 into an external auditory canal, air-conducted tone and vibration sound are transmitted to the user. Therefore, it is difficult for ambient noise to enter the external auditory canal of the user. As a result, it is possible to improve the quality of sound to be transmitted to the user.

On the rear surface of the panel 20*a*, the display 2 and the piezoelectric element 7 are attached by a bonding member 30 (see FIG. 5). The piezoelectric element 7 is spaced apart from the inner surface of the housing 40 by a predetermined distance in a state where the piezoelectric element has been disposed on the rear surface of the panel 20*a*. It is preferable that the piezoelectric element 7 is spaced apart from the inner surface of the housing 40 even in a state where the piezoelectric element has expanded and contracted or bent. That is, it is preferable that a distance between the piezoelectric element 7 and the inner surface of the housing 40 is larger than the maximum deformation amount of the piezoelectric element 7. The piezoelectric element 7 may be attached to the panel 20*a* through a reinforcing member (for example, a metal plate or glass-fiber reinforced resin). The bonding member 30 is, for example, double-sided tape, or an adhesive having a thermosetting property, an ultraviolet-curing property, or the like. The bonding member 30 also may be a photoelastic resin which is a colorless and transparent ultraviolet-curable acrylic adhesive.

The piezoelectric element 7 is arranged in the vicinity of a place spaced apart from an end portion in the short direction of the panel 20*a* by a predetermined distance such that the longitudinal direction of the piezoelectric element 7 becomes parallel to the longitudinal direction of the panel 20*a* (see FIG. 1). The center of the piezoelectric element 7 in the longitudinal direction is positioned on a straight line passing through the center of the panel 20*a* in the longitudinal direction and parallel to the short direction of the panel 20*a*.

Also, in the present embodiment, the piezoelectric element 7 may be attached to each of areas 7*a*, 7*b*, and 7*c* of the rear surface of the display 2, or may be attached to one or two of the areas 7*a*, 7*b*, and 7*c*. The display 2 to which the piezoelectric element 7 has been attached deforms according to expansion and contraction or bending of the piezoelectric element 7. Also, a panel 20 to which the display 2 has been attached also deforms according to deformation of the display 2. In this case, if the user brings a part (auricular cartilage) of his body into contact with the panel 20, the panel 20 generates vibration sound (human body vibration sound) to be transmitted to the user through the part of his body. In a case where the piezoelectric element 7 has been attached to the area 7*a*, vibration which is generated by deformation of the piezoelectric element 7 is transmitted to the panel 20*a* through the display 2, whereby the panel 20*a* deforms. Since the panel 20*a* has almost the same size as that of the front surface of the mobile phone 1, for example, in an area larger than an ear of the user, it is easy to generate vibration of the panel 20. In a case where the piezoelectric element 7 has been attached to the area 7*b*, vibration which is generated by deformation of the piezoelectric element 7 is transmitted to the panel 20*b* through the display 2, whereby the panel 20*b* deforms. Since the panel 20*b* has a size which is almost a half of the size of the panel 20*a*, as compared to a case of attaching the piezoelectric element 7 to the area 7*a*, it is possible to reduce the area of the panel 20 to vibrate due to deformation of the piezoelectric element 7, and it is possible to reduce sound leakage. In a case where the piezoelectric element 7 has been attached to the area 7*c*, vibration which is generated by deformation of the piezoelectric element 7 is transmitted to the panel 20*c* through the display 2, whereby the panel 20*c* deforms. In this case, since vibration of the piezoelectric element 7 is transmitted even to both of the areas 7*a* and 7*b* connected to the area 7*c* of the display 2, the panels 20*a* and 20*b* also deform. Therefore, the user can hear sound by putting an ear on any one surface of the front surface and rear surface of the mobile phone 1. Also, the piezoelectric element 7 may be attached to an area which is included in the rear surfaces of the panels 20*b* and 20*c* and to which the display 2 has not been attached.

The touch screen (touch sensor) 21 is arranged so as to overlap the display 2. The touch screen 21 detects contacts. Based on contacts which are detected by the touch screen 21, the controller 10 (the mobile phone 1) detects various operations (gestures) which are performed on the touch screen 21 by use of a finger, a stylus, a pen, or the like (hereinafter, referred to simply as a "finger"). For example, the touch screen 21 has a touch sensor. The touch sensor detects a contact of a finger with the touch screen 21 and the position of the contact point on the touch screen 21, and notifies them to the controller 10. The controller 10 detects operations (gestures) of the user on the surface of the display 2 by cooperating with the touch screen 21. Examples of various operations (gestures) which the controller 10 detects through the touch screen 21 include a touch, a long touch, a release, a swipe, a tap, a double tap, a long tap, a drag, a flick, a pinch-in, and a pinch-out, but are not limited thereto. The detection method of the touch screen 21 may be an arbitrary method such as an electrostatic capacity method, a resistance film method, a surface acoustic wave method (or an ultrasonic method), an infrared ray method, an electromagnetic induction method, and a load detection method. As shown in FIG. 1, the display 2 and the touch screen 21 are functionally separated, but may be physically unified as a touch screen display.

Contacts which are detected by the touch screen 21 include a contact of an auricle with the panel 20*a*, or the like.

The touch screen 22 is arranged on the rear surface 1B of the mobile phone 1. In the present embodiment, the touch screen 22 has a size which is about a half of the size of the touch screen 21. The touch screen 23 is arranged on the top surface 1C of the mobile phone 1.

The touch screen 22 detects contacts with the rear surface, and the touch screen 23 detects contacts with the top surface. The detection results of the touch screen 22 or the touch screen 23 are used to detect contact operations of the user using a finger, a pen, a stylus, or the like. Examples of operations (gestures) which are determined based on contacts which are detected using the touch screen 22 or the touch screen 23 include a touch, a long touch, a release, a swipe, a tap, a double tap, a long tap, a drag, a flick, a pinch-in, and a pinch-out, but are not limited thereto. The detection method of the touch screen 22 or the touch screen 23 may be any method such as an electrostatic capacity method, a resistance film method, a surface acoustic wave method (or an ultrasonic method), an infrared ray method, an electromagnetic induction method, and a load detection method. The detection method of the touch screen 22 or the touch screen 23 may be different from the detection method of the touch screen 21.

The housing 40 is formed using a resin or a metal. The housing 40 supports the display 2, the illuminance sensor 4, the proximity sensor 5, the first microphone 8a, the second microphone 8b, the camera 12, the panel 20a, and so on.

To the piezoelectric element 7, an electric signal according to sound to be output is applied. To the piezoelectric element 7, for example, ±15 V which is higher than ±5 V being a supply voltage for a so-called panel speaker for transmitting sound by air-conducted sound through an external auditory canal may be applied. Accordingly, even in a case where the user presses a part of his body against the panel 20a, for example, with a force of 3 N or more (a force of 5 N to 10 N), the piezoelectric element 7 can cause the panel 20a to sufficiently vibrate, thereby generating vibration sound to be transmitted through the part of the body of the user. The voltage to be applied to the piezoelectric element 7 can be appropriately adjusted according to the fixing strength of the panel 20a to the housing 40, the performance of the piezoelectric element 7, or the like.

If an electric signal is applied, the piezoelectric element 7 expands and contracts or bends in the longitudinal direction. The panel 20a to which the piezoelectric element 7 has been attached deforms according to the expansion and contraction or bending of the piezoelectric element 7. As a result, the panel 20a vibrates, thereby generating air-conducted sound. Further, in a case where the user brings a part (for example, an auricular cartilage) of his body, the panel 20a generates vibration sound to be transmitted to the user through the part of his body. That is, according to deformation of the piezoelectric element 7, the panel 20a vibrates at a frequency which can be perceived as vibration sound for an object being in contact with the panel 20a.

For example, if an electric signal according to sound data such as the voice of the other party of a call, or a ring tone, or music is applied to the piezoelectric element 7, the panel 20a generates air-conducted sound and vibration sound corresponding to the electric signal. A sound signal to be output through the piezoelectric element 7 and the panel 20a may be based on sound data stored in a storage 9 to be described below. A sound signal to be output through the piezoelectric element 7 and the panel 20a may be based on sound data stored in an external server or the like and acquired through a network by the communication unit 6 to be described below.

In the present embodiment, the panel 20a may have almost the same size as that of an ear of the user. Also, the panel 20a may have a size larger than that of an ear of the user. In this case, on the occasion of hearing sound, the user can bring the substantially entire outer circumferential portion of an ear into contact with the panel 20a. The user hears sound in this way, and thus it is difficult for ambient sound (noise) to enter an external auditory canal. In the present embodiment, at least, the panel 20a vibrates in an area wider than an area having a longitudinal (or short) length corresponding to a distance from a lower antihelix crus (inferior antihelix crus) of a human being to an antitragus and a short (or longitudinal) length corresponding to a distance from a tragus to an antitragus. The panel 20a may vibrate in an area having a longitudinal (or short) length corresponding to a distance from a part in the vicinity of the upper antihelix crus (superior antihelix crus) of a helix to an ear lobe and a short (or longitudinal) length corresponding to a distance from a tragus to a part in the vicinity of the antihelix of the helix. The area having the length and the width described above may be a rectangular area, or may have an elliptical shape having the above described longitudinal length as a long diameter and the above described short length as a short diameter. The average size of human ears can be seen, for example, from Japanese Body Dimension Database (1992-1994) provided by the Research Institute of Human Engineering for Quality Life (HQL).

The panel 20a vibrates not only in an attachment area 20a to which the piezoelectric element 7 has been attached, but also in an area spaced apart from the attachment area 20a. The panel 20a has a plurality of parts which is included in the vibration area and vibrates in a direction intersecting with a main surface of the panel 20a, and in each of the plurality of parts, the value of the amplitude of vibration varies from a positive value to a negative value, or vise versa with time. At each moment, the panel 20a vibrates in such a manner that parts with relatively large vibration amplitude and parts with relatively small vibration amplitude are seemingly distributed randomly or regularly almost in the whole of the panel 20a. That is, over the entire panel 20a, vibrations of a plurality of waves are detected. If the voltage which is applied to the piezoelectric element 7 is ±15 V as described above, even in a case where the user presses the panel 20a against the user's body, for example, with a force of 5 N to 10 N, it is difficult to damp the above described vibration of the panel 20a. Therefore, the user cannot hear vibration sound even if bringing an ear into contact with an area spaced apart from the attachment area 20a on the panel 20a.

By vibration of the panel 20a, the mobile phone 1 can transmit air-conducted sound and vibration sound through a part (for example, auricular cartilage) of the body of the user, to the user. Therefore, in a case of outputting sound at the same volume as that of a dynamic receiver, the mobile phone 1 can reduce sound to be transmitted to the surroundings of the mobile phone 1 by vibration of air, as compared to an electronic device provided with only a dynamic speaker. This feature is suitable, for example, for a case of hearing a recorded message in a place where there is another person close to the user like on a train.

Further, the mobile phone 1 transmits vibration sound to the user by vibration of the panel 20a. Therefore, even when the user is wearing an earphone or a headphone on the body, the user can hear vibration sound attributable to vibration of the panel 20a, through either the earphone or the headphone, and a pat of the body, by bringing the mobile phone 1 into contact with them.

Furthermore, the mobile phone 1 transmits sound by vibration of the panel 20a. Therefore, in a case where the mobile phone 1 does not separately have a dynamic receiver, it is unnecessary to form an opening (a sound emission opening) for transmitting sound which the panel 20a emits to the outside, in the housing 40.

Therefore, in a case of implementing a waterproof structure, it is possible to simplify the structure. In a case where it is necessary to form an opening such as a sound emission opening of a dynamic speaker in the housing 40, in order to implement a waterproof structure, the mobile phone 1 may use a structure in which the opening is occluded by a member which allows passage of gas but does not allow passage of liquid. The member which allows passage of gas but does not allow passage of liquid is, for example, Gore-Tex (a registered trademark).

The mobile phone 1 may have a speaker such as a dynamic speaker.

In the following description, there is a case where a combination of the piezoelectric element 7 and the panel 20a is referred to as a vibration receiver.

Figure 6:
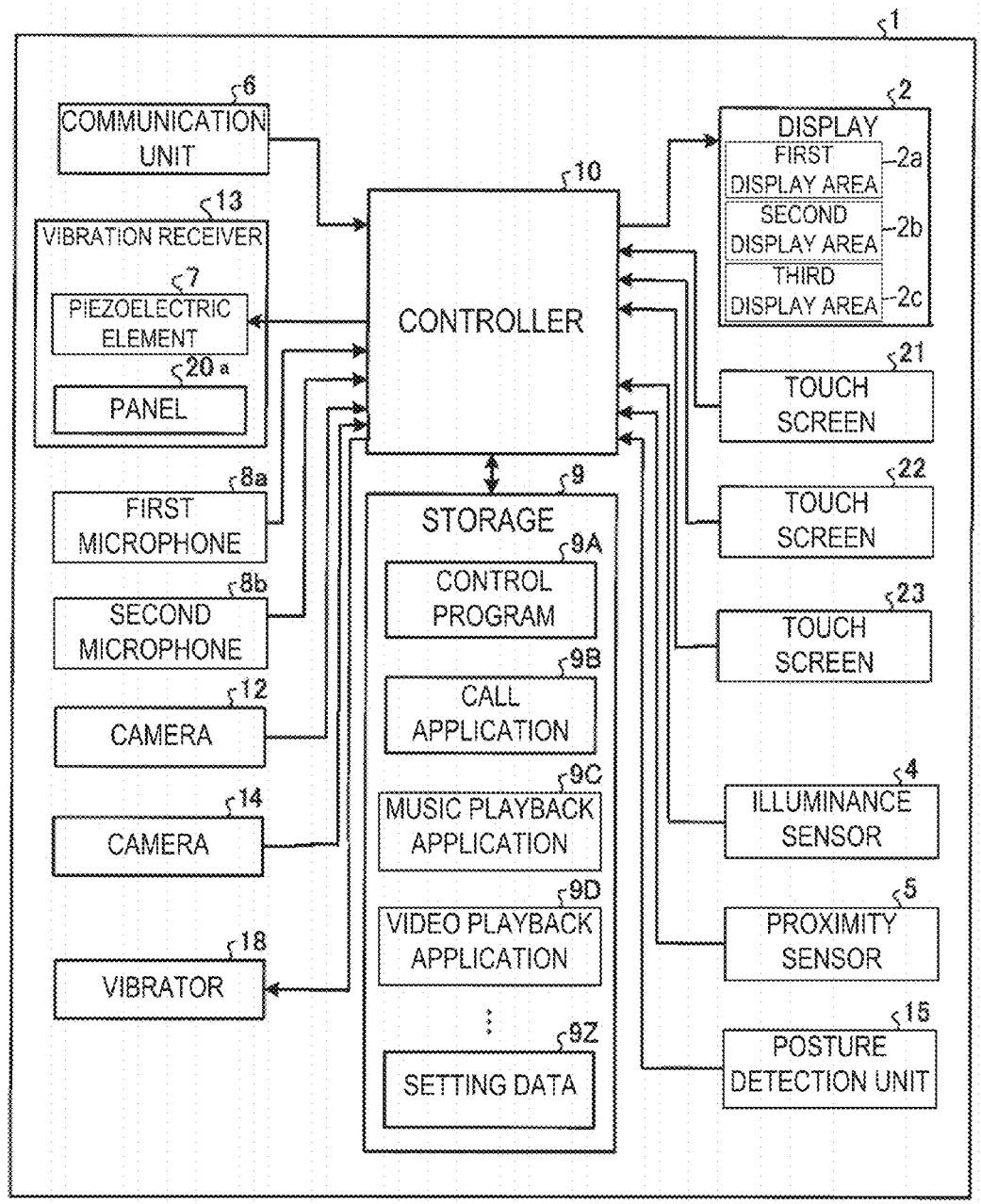
FIG. 6 is a block diagram of a mobile phone according to an embodiment.

With reference to FIG. 6, the functional configuration of the mobile phone 1 will be described. FIG. 6 is a block diagram of the mobile phone 1 according to the embodiment. As shown in FIG. 6, the mobile phone 1 includes the display 2, the illuminance sensor 4, the proximity sensor 5, the communication unit 6, the piezoelectric element 7, the first microphone 8*a*, the second microphone 8*b*, the storage 9, the controller 10, the camera 12, a vibration receiver 13 including the piezoelectric element 7 and the panel 20*a*, a posture detection unit 15, a vibrator 18, and the touch screen 21.

The communication unit 6 performs communication in a wireless manner. Communication systems which can be supported by the communication unit 6 are wireless communication standards. As the wireless communication standards, there are cellular-phone communication standards such as 2G, 3G, and 4G. Examples of the cellular-phone communication standards include LTE (Long Term Evolution), W-CDMA (Wideband Code Division Multiple Access), CDMA 2000, PDC (Personal Digital Cellular), GSM (a registered trademark) (Global System for Mobile Communications), PHS (Personal Handy-phone System), and so on. Examples of the wireless communication standards further include WiMAX (Worldwide Interoperability for Microwave Access), IEEE 802.11, Bluetooth (a registered trademark), IrDA (Infrared Data Association), NFC (Near Field Communication), and so on. The communication unit 6 may support one or more of the above described communication standards.

The storage 9 stores programs and data. The storage 9 is also used as a work area for temporarily storing process results of the controller 10. The storage 9 may include an arbitrary non-transitory storage medium such as a semiconductor storage medium and a magnetic storage medium. The storage 9 may include a plurality of types of storage media. The storage 9 may include a combination of a portable storage medium such as a memory card, an optical disc, or a magneto-optical disc with a storage medium reading device. The storage 9 may include a storage device which is used as a temporary storage area, such as a RAM (Random Access Memory).

The programs which are stored in the storage 9 include applications which can be executed in the foreground or the background, and a control program which supports operations of the applications. In applications which can be executed in the foreground, for example, screens are displayed on the display 2. The control program includes, for example, an OS. The applications and the control program may be installed in the storage 9 through wireless communication of the communication unit 6 or a non-transitory storage medium.

The storage 9 stores, for example, a control program 9A, a call application 9B, a music playback application 9C, a video playback application 9D, and setting data 9Z. The call application 9B provides a call function for calls using wireless communication. The music playback application 9C provides a music playback function for playing sound from music data. The video playback application 9D provides a video playback function for playing videos and sound from video data. The setting data 9Z includes various settings associated with operations of the mobile phone 1 and information relative to processes.

Sound (for example, a call voice) according to the function which the call application 9B provides is output from the vibration receiver 13.

The control program 9A provides a function relative to various control for operating the mobile phone 1. The control program 9A realizes a call, for example, by controlling the communication unit 6, the piezoelectric element 7, the first microphone 8*a*, the second microphone 8*b*, and so on. The function which the control program 9A provides may be used in combination with the function which another program such as the call application 9B provides.

The function which the control program 9A provides includes a function of determining which of the first microphone 8*a* and the second microphone 8*b* will be used, during a call. For example, the control program 9A includes a function of determining which of the first microphone 8*a* and the second microphone 8*b* will be used, during a call, based on a detection result of the posture detection unit 15.

The controller 10 is an arithmetic processing unit. Examples of the arithmetic processing unit include a CPU (Central Processing Unit), an SoC (System-on-a-Chip), an MCU (Micro Control Unit), and an FPGA (Field-Programmable Gate Array), but are not limited thereto. The controller 10 generally controls operations of the mobile phone 1, thereby implementing various functions.

Specifically, the controller 10 performs commands included in programs stored in the storage 9 while referring to data stored in the storage 9 if necessary. Then, the controller 10 controls functional units according to the data and the commands, thereby implementing various functions. Examples of the functional units include the display 2, the communication unit 6, the piezoelectric element 7, the first microphone 8*a*, the second microphone 8*b*, and the vibrator 18, but are not limited thereto. The controller 10 may change control in response to detection results of detecting units. Examples of the detecting units include the illuminance sensor 4, the proximity sensor 5, the camera 12, the posture detection unit 15, and the touch screen 21, but are not limited thereto.

The controller 10 executes, the control program 9A, thereby performing a process of determining which of the first microphone 8*a* and the second microphone 8*b* will be used during a call. For example, the controller 10 determines which of the first microphone 8*a* and the second microphone 8*b* will be used, during a call, based on a detection result of the posture detection unit 15.

The vibration receiver 13 generates, for example, air-conducted sound and vibration sound corresponding to a call voice, and transmits them to the user.

The posture detection unit 15 detects a posture of the mobile phone 1. In order to detect the posture, the posture detection unit 15 includes at least one of an acceleration sensor, a direction sensor, and a gyroscope. The posture detection unit 15 measures an angle (A) which the housing 40 of the mobile phone 1 forms, for example, with respect to the acceleration of gravity (g), for example, based on the detection results of the acceleration sensor, the direction sensor and the gyroscope, and transmits the angle to the controller 10.

The vibrator 18 vibrates a part of or the whole of the mobile phone 1. In order to generate vibration, the vibrator 18 has, for example, a piezoelectric element or an eccentric motor. Vibration which is generated by the vibrator 18 is used to notify various events such as an incoming call to the user.

A part or all of the programs and the data which the storage 9 stores in FIG. 6 may be downloaded from another device by wireless communication of the communication unit 6. A part or all of the programs and the data which the storage 9 stores in FIG. 5 may be stored in a non-transitory storage medium which a reading device included in the storage 9 can read. Examples of the non-transitory storage medium include an optical disc such as CD (a registered trademark), DVD (a registered trademark), or Blu-ray (a registered trademark), a magneto-optical disc, a magnetic storage medium, a memory card, and a solid-state storage medium, but are not limited thereto.

The configuration of the mobile phone 1 shown in FIG. 6 is an example and may be appropriately modified in a range which does not depart from the gist of the present invention. For example, the mobile phone 1 may have buttons of a ten-key arrangement, a QWERTY arrangement, or the like, as buttons for operations.

<Display Control>

With reference to FIGS. 7 to 13, a display operation of the mobile phone 1 will be described. FIG. 7 is a view illustrating display modes in the plurality of display areas of the display 2.

The mobile phone 1 can switch which of the first display area 2a, the second display area 2b, and the third display area 2c of the display 2 displays predetermined information, based on the detection result of the illuminance sensor 4, the detection result of the proximity sensor 5, and the detection result of the posture detection unit 15. Specifically, the controller 10 controls display of each of the first display area 2a, the second display area 2b, and the third display area 3c of the display 2, based on the detection result of the illuminance sensor 4, the detection result of the proximity sensor 5, and the posture of the mobile phone 1 detected by the posture detection unit 15.

For example, in a case where the posture detection unit 15 detects a posture where the front surface 1A or the rear surface 1B of the mobile phone 1 is parallel to a vertical direction and the proximity sensor 5 detects that an object is close to the mobile phone 1 as shown in FIG. 7A, the mobile phone 1 displays predetermined information (here, information on date and time) in the third display area 3c. Due to this control, for example, in a case where the mobile phone 1 is in a breast pocket in a state where the user is standing upright, the user can confirm the information on date and time without taking the mobile phone 1 out of the breast pocket.

Also, for example, the posture detection unit 15 can detect which of the first display area 2a and the second display area 2b is positioned relatively higher, and based on the corresponding detection result, the mobile phone 1 can display information on date and time in one display area positioned relatively higher. That is, the mobile phone 1 displays information on date and time in the first display area 2a as shown in FIG. 7B, in a case where the first display area 2a is positioned upper than the second display area 2b, and displays information on date and time in the second display area 2b as shown in FIG. 7C, in a case where the second display area 2b is positioned upper than the first display area 2a.

Also, in a case of displaying predetermined information in one display area, display of information in the other display areas may not be performed. Display of information in a display area less likely to be viewed by the user is not performed, whereby it is possible to reduce electric power which is consumed in the mobile phone 1.

In the above description, there has been shown an example in which the controller 10 controls which of the plurality of display areas of the display 2 displays information, based on the detection result of the illuminance sensor 4, the detection result of the proximity sensor 5, and the posture of the mobile phone 1 detected by the posture detection unit 15. However, the present invention is not limited thereto. The controller 10 may determine the state of the mobile phone 1 based on an image which is acquired by the camera 12 or the camera 14 and control which display area of the plurality of display areas of the display 2 displays information, based on the corresponding determination result, or the controller 10 may determine the state of the mobile phone 1 based on the detection results of the illuminance sensor 4, the proximity sensor 5 and the posture detection unit 15 as well. Although the posture detection unit 15 detects that the second display area 2b is positioned upper than the first display area 2a, if the face of the user is detected by the camera 12, the mobile phone 1 may display information in the first display area 2a positioned relatively lower. Therefore, for example, in a case where the user operates the mobile phone 1 in a state where the user is lying on his back, since information is displayed in the first display area 2a which the user is viewing, the user does not feel inconvenience. A touch sensor (not shown) may be arranged on a side of the mobile phone 1, and the contact detection result of the touch sensor may be added to the criteria.

The mobile phone 1 can simultaneously display the same information or different information in each of the first display area 2a, the second display area 2b, and the third display area 2c of the display 2, according to control of the controller 10. Display control of the mobile phone 1 in this case will be described using FIGS. 8 to 11.

FIG. 8 is a view illustrating a first example of display control in the plurality of display areas of the display 2. FIG. 8A is a view illustrating the third display area 2c provided on the top surface 1C of the mobile phone 1, as viewed from the above. In FIG. 8A, the upper side of the drawing is the rear surface (1B) side, and the lower side of the drawing is the front surface (1A) side. Hereinafter, the positional relation between the front surface 1A and the rear surface 1B in each view illustrating the third display area 3c is considered as being identical to that in FIG. 8A unless otherwise mentioned.

As shown in FIG. 8A, at the right end portion of the third display area 2c, there is displayed a mail icon consisting of an envelope picture and a number "1". The mail icon represents that there is one unread mail. The third display area 2c is used as an indicator area. Further, the user performs a flick in a direction from the top surface 1C, as starting point, toward the front surface 1A (an arrow direction of the drawing), on the mail icon displayed in the third display area 2c, with a finger.

FIG. 8B is a view illustrating a transition between screens which are displayed in the first display area 2a before and after a flick on the mail icon is performed as shown in FIG. 8A. Before the flick is performed, a home screen is displayed in the first display area 2a, as shown on the left of FIG. 8B. Then, if the flick is performed as shown on the right of FIG. 8B, the contents of the unread mail is displayed in the first display area 2a.

The display control shown in FIGS. 8A and 8B will be described in detail. First, the controller 10 of the mobile phone 1 displays the home screen in the first display area 2a. Then, the controller 10 detects a flick in the direction from the top surface 1C toward the front surface 1A, on the mail icon displayed in the third display area 2c, through the touch screen 23 provided on the top surface 1C of the mobile phone 1. When detecting a flick in the direction from the top surface 1C toward the front surface 1A on the mail icon, the controller 10 displays the contents of the unread mail which is information corresponding to the mail icon, in the first display area 2a of the front surface (1A) side of the mobile phone 1.

Figure 9A:
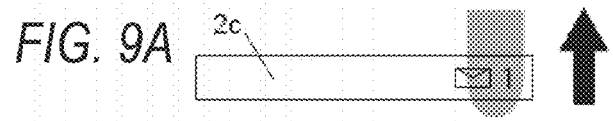
FIGS. 9A and 9B are views illustrating a second example of display control in the plurality of display areas of the display.

FIG. 9 is a view illustrating a second example of display control in the plurality of display areas of the display 2. As shown in FIG. 9A, as shown in FIG. 8A, a mail icon representing that there is one unread mail is displayed in the third display area 2c. Then, the user performs a flick in a direction from the top surface 1C, as starting point, toward the rear surface 1B (an arrow direction of the drawing), on the mail icon displayed in the third display area 2c, with a finger. The flick direction shown in FIG. 9A is the opposite direction to the flick direction shown in FIG. 8A.

Figure 9B:
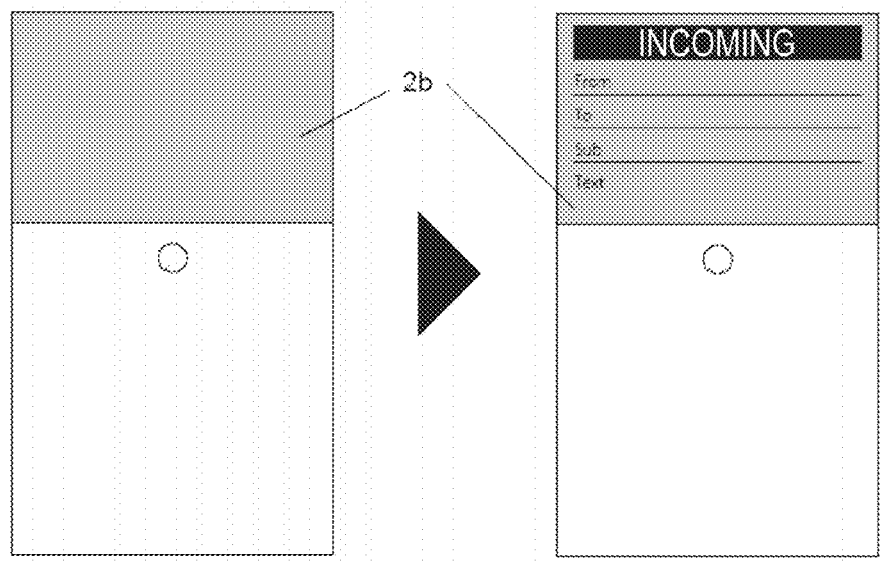

FIG. 9B is a view illustrating a transition between screens which are displayed in the second display area 2b before and after the flick on the mail icon is performed as shown in FIG. 9A. Before the flick is performed, as shown on the left of FIG. 9B, a particular thing is not displayed in the second display area 2b. Then, if the flick is performed, as shown on the right of FIG. 9B, the contents of the unread mail is displayed in the second display area 2b.

The display control shown in FIGS. 9A and 9B will be described in detail. The controller 10 of the mobile phone 1 detects a flick in the direction from the top surface 1C toward the rear surface 1B, on the mail icon displayed in the third display area 2c, through the touch screen 23 provided on the top surface 1C of the mobile phone 1. If detecting a flick in the direction from the top surface 1C toward the rear surface 1B, on the mail icon, the controller 10 displays the contents of the unread mail which is information corresponding to the mail icon, in the second display area 2b of the rear (1B) side of the mobile phone 1.

Also, as described above, the area of the second display area 2b is smaller than that of the first display area 2a. Therefore, in a case of displaying the contents of the unread mail in the second display area 2b, the controller 10 may reduce the size of characters such that all of the contents of the unread mail are displayed in the second display area 2b.

Figure 10A:
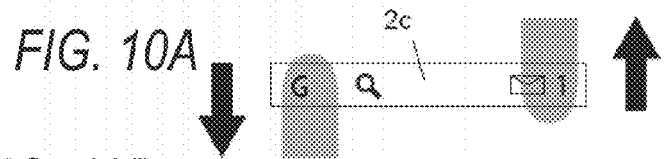
FIGS. 10A and 10B are views illustrating a third example of display control in the plurality of display areas of the display.

FIG. 10 is a view illustrating a third example of display control in the plurality of display areas of the display 2. As shown in FIG. 10A, at the right end portion of the third display area 2c, there is displayed a mail icon representing that there is one unread mail, similarly to FIG. 8A. At the left end portion of the third display area 2c, there is displayed a game icon which is an icon associated with a game application and has the shape of an alphabet "G". Between the game icon and the unread mail icon in the third display area 2c, there is displayed an icon which is an icon associated with a retrieval application and has the shape of a magnifying glass.

Then, the user performs a flick in a direction from the top surface 1C, as a starting point, toward the front surface 1A, on the game icon displayed in the third display area 2c, with a finger. Also, another user or the same user performs a flick in a direction from the top surface 1C, as a starting point, toward the rear surface 1B, on the mail icon displayed in the third display area 2c, with a finger.

Figure 10B:
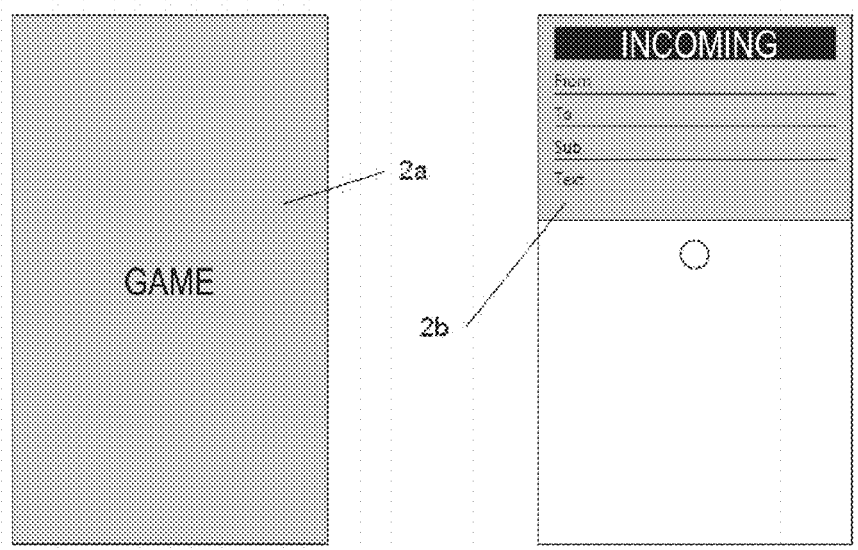

If the flicks are performed respectively, as shown in FIG. 10B, a game application screen is displayed in the first display area 2a while an unread mail screen is displayed in the second display area 2b.

Screen control of the controller 10 in FIG. 10 is the same as that in the first example shown in FIG. 8 and that in the second example shown in FIG. 9. However, the individual flicks in FIG. 10A may be performed simultaneously. In this case, the controller 10 may give priority, for example, to the flick in the direction from the top surface 1C, as a starting point, toward the front surface 1A, of the individual flicks which are detected through the touch screen 23 to display the game screen in the first display area 2a, and then display the unread mail screen in the second display area 2b.

FIG. 11 is a view illustrating a fourth example of display control in the plurality of display areas of the display 2. As shown in FIGS. 11A and 11B, at the right end portion of the third display area 2c, there is displayed a camera icon corresponding to a camera application. Then, if a flick in a direction from the top surface 1C, as a starting point, toward the front surface 1A is performed on the camera icon, a camera finder screen is displayed in the first display area 2a. Meanwhile, if a flick in a direction from the top surface 1C, as a starting point, toward the rear surface 1B is performed on the camera icon, a camera finder screen is displayed in the second display area 2b.

Since the camera 12 is provided on the front surface 1A and the camera 14 is provided on the rear surface 1B, the mobile phone 1 of the present embodiment performs imaging by the camera 13 in a state shown in FIG. 11A, and performs imaging by the camera 12 in a state shown in FIG. 11B. By the way, as shown in FIGS. 11A and 11B, the mobile phone 1 can use both of the first display area 2a and the second display area 2b as camera finders. Therefore, in a case of using the first display area 2a as a camera finder as shown in FIG. 11A, if a tap of the user is detected through the touch screen 22 of the rear surface (1B) side, the mobile phone 1 may perform imaging. On the contrary, in a case of using the second display area 2b as a camera finder as shown in FIG. 11B, if a tap of the user is detected through the touch screen 21 of the front surface (1A) side, the mobile phone 1 may perform imaging. Therefore, in a case where the user is gripping the mobile phone 1 with one hand, it is possible to perform imaging by tapping the touch screen 21 or the touch screen 22 with a finger of the gripping hand, without using the other hand, and thus usability is improved.

Also, the camera 14 is provided in the vicinity of the center in the longitudinal direction of the rear surface 1B so as to be adjacent to the panel 20b (and the second display area 2b) on the rear surface 1B. Therefore, in a case where the user turns the rear surface (1B) side toward himself and uses the camera 14 to attempt imaging of his posture reflected in the second display area 2b, the camera 14 is positioned in front of his face such that it is possible to perform imaging while viewing the second display area 2b serving as a finder, and thus usability is further improved.

Next, an example of control according to a gesture on the third display area 2c will be described using FIGS. 12 and 13.

FIG. 12 is a view illustrating a first example of control according to a gesture on the third display area 2c. FIG. 12B shows a state where the user is performing a call by the call application. In this case, as shown in FIG. 12A, the user performs a swipe in a direction from the left toward the right on the third display area 2c. If detecting the swipe in the direction from the left toward the right on the third display area 2c through the touch screen 23, the controller 10 of the mobile phone 1 makes the volume of call sound relatively large. On the contrary, if detecting a swipe from the right toward the left on the third display area 2c through the touch screen 23, the controller 10 makes the volume of call sound relatively small.

Figure 13A:
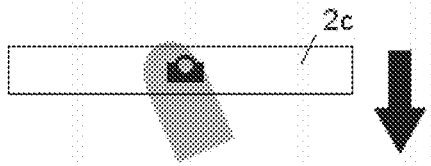
FIGS. 13A and 13B are views illustrating a second example of control according to a gesture on the third display area.
Figure 13B:
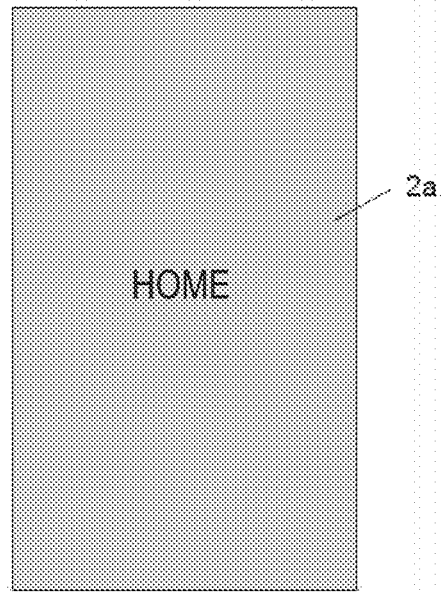

FIG. 13 is a view illustrating a second example of control according to a gesture on the third display area 2c. In a state shown in FIG. 13A, the mobile phone 1 is in a locked state. Then, at the central portion of the third display area 2c, an unlocking icon is displayed. Then, the user performs a flick in a direction from the top surface 1C, as a starting point, toward the front surface 1A, on the unlocking icon displayed in the third display area 2c, with a finger. If detecting the flick in the direction from the top surface 1C, as a starting point, toward the front surface 1A on the unlocking icon, the controller 10 of the mobile phone 1 releases the locking of the mobile phone 1 and then displays the home screen in the first display area 2a of the front surface (1A) side.

As described above, the mobile phone 1 according to the present embodiment includes the touch screen 23 on the top surface 1C connecting the front surface 1A and the rear surface 1B of the mobile phone. If a flick (a first gesture) in the direction from the top surface 1C toward the front surface 1A is detected through the touch screen 23, the mobile phone displays a screen according to the corresponding flick in the first display area 2a of the front surface (1A) side. Also, if a flick (a second gesture) in the direction from the top surface 1C toward the rear surface 1B is detected, the mobile phone displays a screen according to the corresponding flick in the second display area 2b of the rear surface (1B) side. Therefore, the usability of the mobile phone 1 is improved.

Also, the mobile phone 1 according to the present embodiment controls display of the third display area 2c, in response to the posture of the mobile phone 1. Therefore, effective utilization of the third display area 2c provided on the top surface 1C of the housing 40 is achieved.

Also, in a mobile phone according to the related art, the indicator area is displayed in the first display area 2a. However, in the mobile phone 1 according to the present embodiment, since the third display area 2c provided on the top surface 1C of the mobile phone 1 is used as the indicator area, effective utilization of the first display area 2a is achieved.

In the above described embodiment, as an example of a device according to the appended claims, the mobile phone has been described. However, the device according to the appended claims is not limited to the mobile phone. The device according to the appended claims may be an electronic device other than the mobile phone. The electronic device include, for example, tablets, portable personal computers, digital cameras, media players, electronic book readers, navigators, and game consoles, but are not limited thereto.

In the above described embodiment, the description has been made, as an example, a configuration in which the display 2 is an organic EL display having flexibility and has the first display area 2a, the second display area 2b, and the third display area 2c. However, the present invention is not limited thereto. The mobile phone 1 may have a configuration in which separate displays (display units) and touch screens are provided on the front surface 1A, the rear surface 1B, and the top surface 1C, respectively.

In the above described embodiment, the touch screen 21, the touch screen 22, and the touch screen 23 are disposed corresponding to the first display area 2a, the second display area 2b, and the third display area 2c, respectively. However, the present invention is not limited thereto. In order to implement the control examples described above, the mobile phone 1 may not have the touch screen 21 which is disposed on the front surface 1A and the touch screen 22 which is disposed on the rear surface 1B, or may not have the third display area 2c which is disposed on the top surface 1C.

The art according to the appended claims has been described with respect to a specific embodiment for a complete and clear disclosure. However, the appended claims are not to be thus limited but are to be construed as embodying all modifications and alternative constructions that may occur to one skilled in the art which fairly fall within the basic teaching herein set forth.

This application is based on Japanese Patent Application No. 2013-031990 filed on Feb. 21, 2013 and Japanese Patent Application No. 2013-031991 filed on Feb. 21, 2013 whose contents are incorporated herein by reference.

DESCRIPTION OF REFERENCE NUMERALS AND SYMBOLS

1 MOBILE PHONE
1A FRONT SURFACE
1B REAR SURFACE
1C TOP SURFACE
2 DISPLAY
2a FIRST DISPLAY AREA
2b SECOND DISPLAY AREA
2c THIRD DISPLAY AREA
4 ILLUMINANCE SENSOR
5 PROXIMITY SENSOR
6 COMMUNICATION UNIT
7 PIEZOELECTRIC ELEMENT
8a FIRST MICROPHONE
8b SECOND MICROPHONE
9 STORAGE
9A CONTROL PROGRAM
9B CALL APPLICATION
9C MUSIC PLAYBACK APPLICATION
9D VIDEO PLAYBACK APPLICATION
9Z SETTING DATA
10 CONTROLLER
12 CAMERA
13 VIBRATION RECEIVER
14 CAMERA
15 POSTURE DETECTION UNIT
18 VIBRATOR
20 PANEL
21 TOUCH SCREEN
22 TOUCH SCREEN
23 TOUCH SCREEN
30 JOINING MEMBER
31 REINFORCING MEMBER
40 HOUSING

The invention claimed is:

1. A device comprising:
a first surface, a second surface, and a third surface connecting the first surface and the second surface;
a touch screen that is disposed on the third surface;
a display, which has a first display area performing display on the first surface, and a second display area performing display on the second surface, and a third display area performing display on the third surface; and
a controller configured to:
display a first icon corresponding to a first application and a second icon corresponding to a second application, in the third region of the display;
display, when detecting a first gesture in which a detection object comes in contact with the first icon and then moves toward the first surface, a first screen based on the first application in the first display region; and
display, when detecting a second gesture in which a detection object comes in contact with the first icon and then moves toward the second surface in a state where the first screen is displayed in the first display region, a second screen based on the first application in the second display region while displaying the first screen in the first display region,
wherein, when the first gesture and the second gesture are detected simultaneously, the controller performs a display operation based on the first gesture with priority over a display operation based on the second gesture, so that the first display in the first display region is displayed before the second display in the second display region.

2. The device according to claim 1, wherein:
the display is one flexible display, and
the flexible display has the first display area and the second display area.

3. The device according to claim 1, wherein, each of the first application and the second application is one from the group consisting of a mail application, a game application, a retrieval application, a camera application, an unlocking application, a call application, a volume control application, a music playback application, and a video playback application.

4. The device according to claim 1, further comprising:
a piezoelectric element configured so that a user of the device hears sound by placing an ear of the user in contact with a surface of the device.

5. The device according to claim 4, wherein the user of the device hears sound by placing the ear of the user in contact with the first surface or the second surface of the device.

6. The device according to claim 1, further comprising:
a piezoelectric element configured to vibrate a corner of the device, wherein the user of the device hears sound by placing the corner of the device into an external auditory canal of the ear of the user.

7. The device according to claim 6, wherein air-conducted tone and vibration sound are transmitted to the user.

* * * * *